Feb. 4, 1930.  W. W. WOOD  1,745,881
AUTOMOBILE SPRING SUSPENSION
Filed Dec. 10, 1923   3 Sheets-Sheet 1
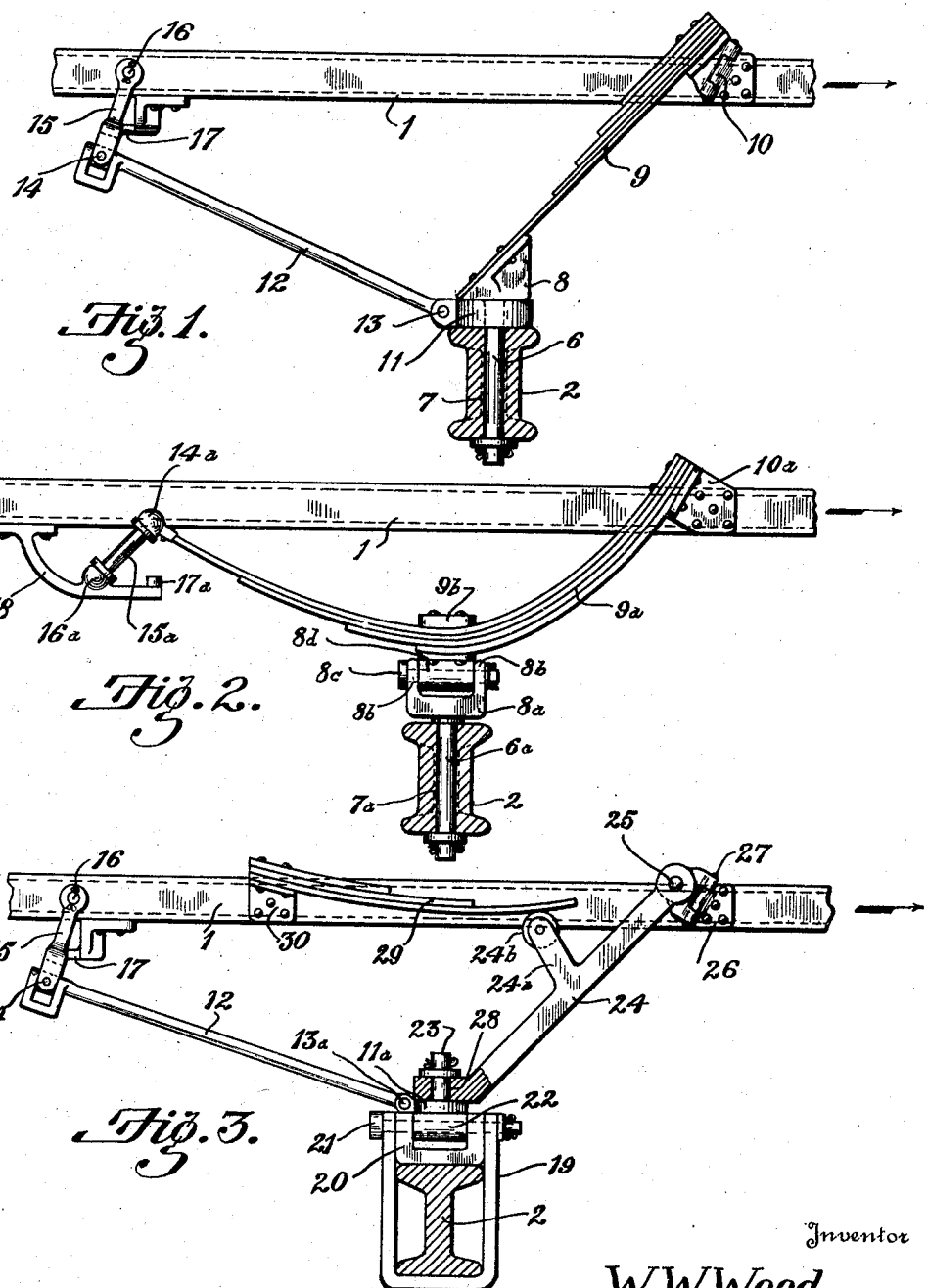

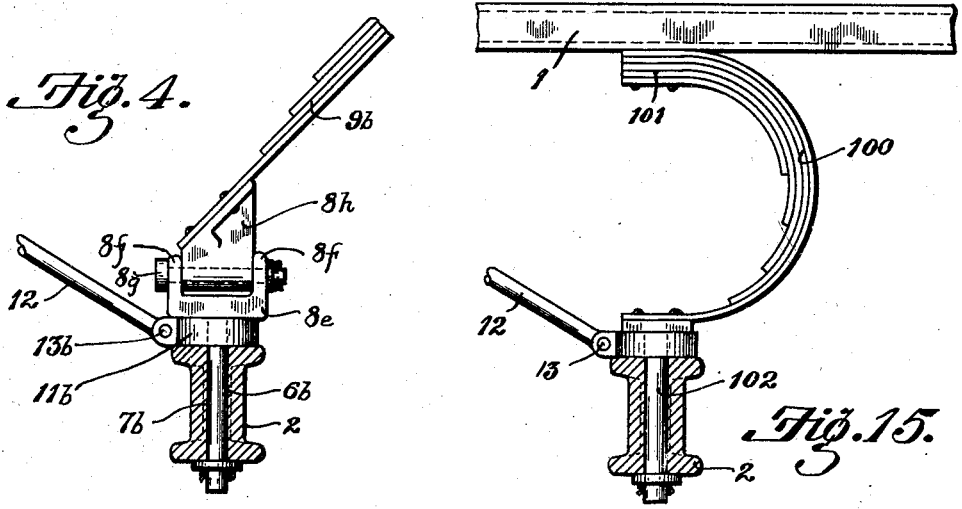
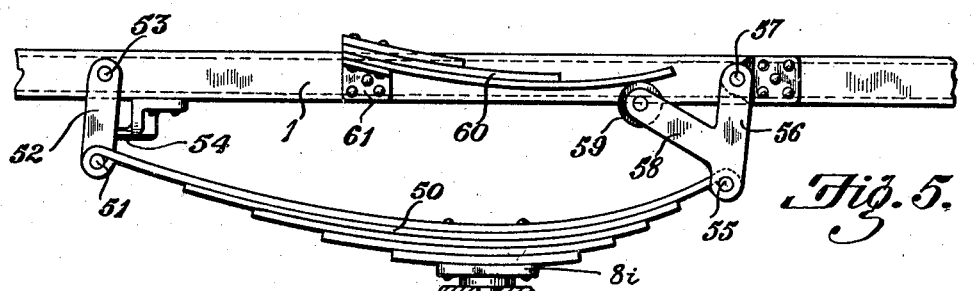
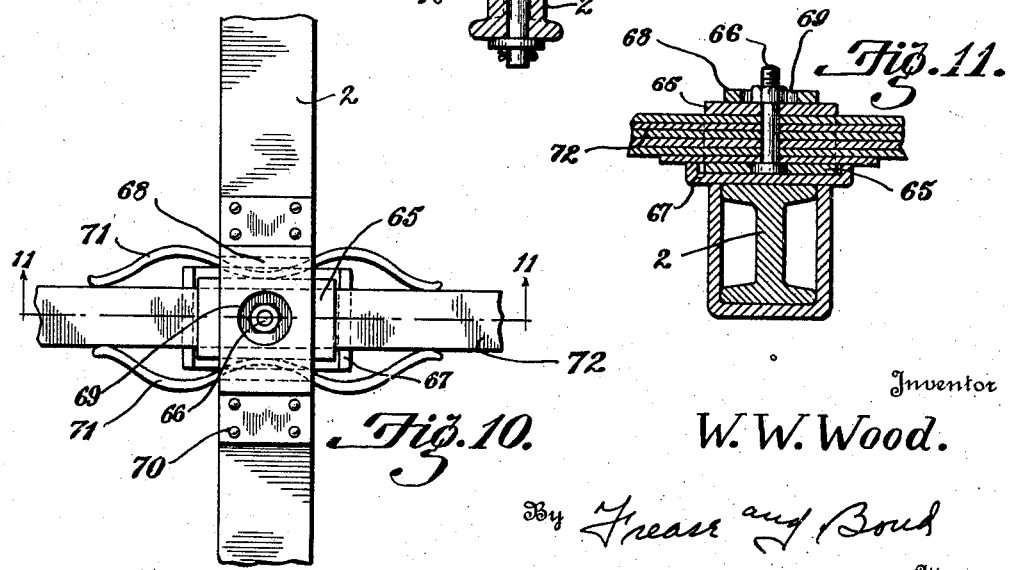

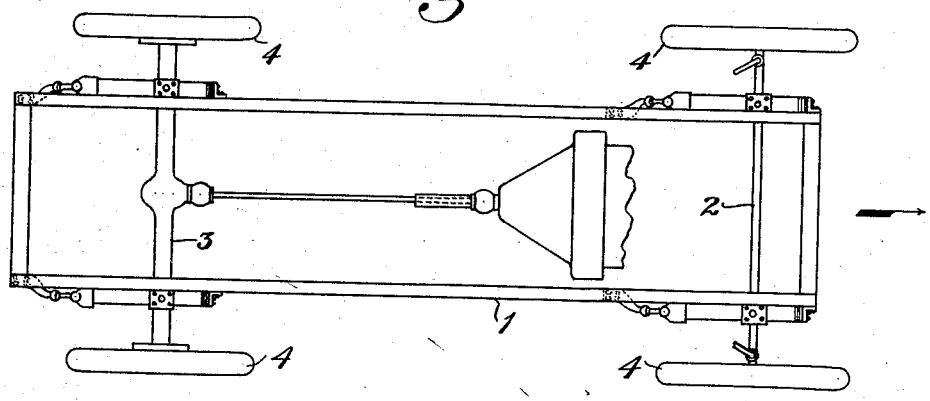
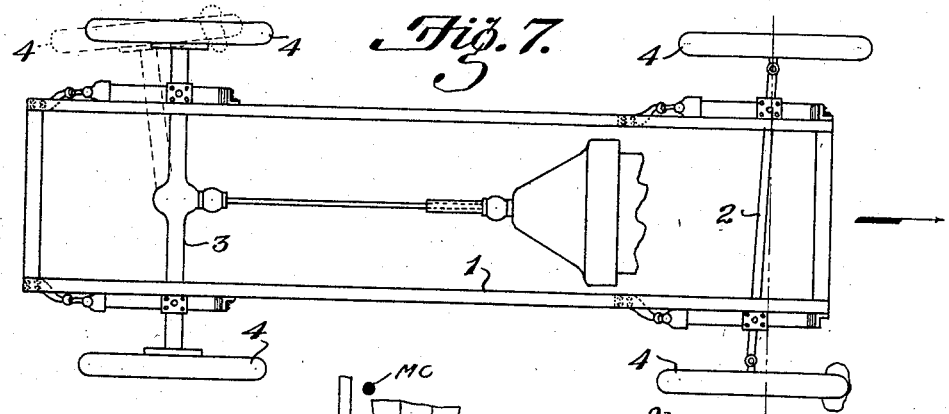
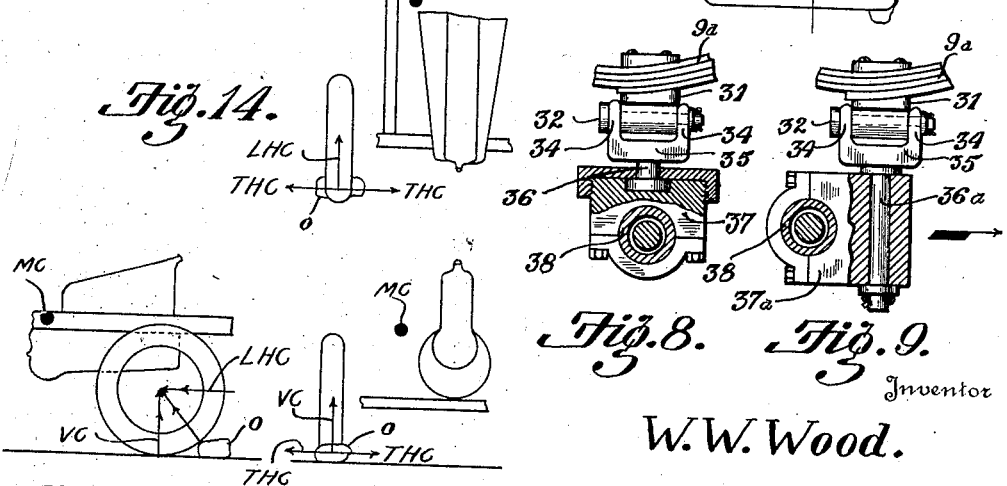

Patented Feb. 4, 1930

1,745,881

UNITED STATES PATENT OFFICE

WALTER W. WOOD, OF CANTON, OHIO

AUTOMOBILE SPRING SUSPENSION

Application filed December 10, 1923. Serial No. 679,598.

When the wheel of a moving automobile or other vehicle encounters an obstacle upon the road, the reaction from the obstacle encountered may vary in direction, but this reaction may always be resolved into three components, viz: a vertical component acting at right angles to the line of the car's movement; a horizontal component acting at right angles to the line of the car's movement; and a horizontal component acting in a line parallel with or longitudinally along the line of the car's movement.

These components may be called the vertical component, transverse horizontal component and longitudinal horizontal component respectively, and it should be noted that the lines of action of each of these forces is fixed in direction and each lies in a certain fixed plane. None of these reference planes passes through the center of the mass affected, although the component forces may vary in amount and in proportion to each other.

It is also important to note that the vertical component and transverse horizontal components are deflecting forces only, acting at right angles to the direction of translation of the vehicle mass, while the longitudinal horizontal component is a pure opposing force which aside from the cushioning effect of the tire must, in the present standard construction of autos, be absorbed as shock.

The result of this is that the nature of the force applied to the mass center in each case, is a turning moment about the mass center instead of a directly applied force through the mass center. The mass affected consists of the wheel, spring, and part of the axle, combined with that part of the vehicle mass supported by this wheel.

The object of this invention is to provide a spring suspension which will utilize the moment exerted by the longitudinal horizontal component, so that the wheel, axle and spring will be lifted partially over the obstacle while a downward pull will be exerted on the part of the vehicle mass affected, which will neutralize wholly or partially the net effect of the vertical component, which as is well known, is to deflect the vehicle mass upward out of its normal course parallel to the road bed.

A further object of the invention is to provide such a spring suspension as while incorporating the features mentioned above, will also cushion the vertical, transverse horizontal and longitudinal horizontal components of the reactions from obstacles encountered by a wheel of the vehicle; and which will permit the axle to assume a position at an angle other than 90° with the longitudinal axis of the vehicle to permit the wheel to lag independently, in relation to the frame, when an obstacle is encountered, thus affording the wheel more time in which to surmount the obstacle.

These objects may be attained by so constructing the spring suspension as to afford opportunity for the combined mass of the wheel and axle on the one hand and that portion of the vehicle mass supported by this wheel on the other hand, to tend to rotate about their common center when the longitudinal horizontal component of the reaction is impressed on the wheel spindle, causing this force to be absorbed in lifting the wheel and depressing the frame; and causing the depressing force exerted on the frame, by this rotating tendency, to come into opposition to the upward effect of the vertical component, so that these two forces wholly or partially neutralize each other, thus tending to leave the frame undisturbed; while the lagging of the wheel tends to cushion the horizontal component of the reaction from the obstacle encountered.

Referring to the drawings, Fig. 1 is a side elevation partly in section of an embodiment of the invention, as applied to a front axle of an automobile;

Figs. 2, 3 and 4, similar views of modified forms of the spring suspension;

Fig. 5, a view of a further modification;

Fig. 6, a plan view of the chassis or frame of an automobile provided with the improved spring suspension, showing the normal position of the wheels and axles;

Fig. 7, a similar view showing the position of the front axle when one wheel encounters an obstacle;

Figs. 8 and 9, fragmentary sectional views showing two forms of connection of the spring suspension to a rear axle;

Figs. 10 and 11, a fragmentary plan view and section respectively, of a modified form of pivotal connection of the axle to the spring;

Figs. 12, 13 and 14, diagrammatic views showing the reactions from obstacles encountered by a wheel; and Fig. 15, a fragmentary side elevation partly in section of a modified form of the invention.

Similar numerals refer to similar parts throughout the drawings.

The chassis or frame of an automobile is shown at 1, the front axle at 2, and rear axle housing at 3, and the wheels carried thereby at 4. These parts may be of well known construction, the invention residing in the spring suspension, whereby the axles are connected to the chassis or frame of the vehicle.

In Fig. 1 a vertical pivot may be provided by locating the spindle 6 through a bearing 7 in the front axle, at a point near each side of the frame or chassis, this spindle having a head 8 to which one end of a forwardly extending, leaf spring 9 is connected, the other end thereof being pivoted as at 10, to a bracket rigidly mounted upon the chassis. The axis of the pivot 10 is forwardly and upwardly inclined from the vertical.

A collar 11 is journaled upon the upper end of the spindle 6, beneath the head 8, and a rigid link 12 is pivotally connected thereto as by the movable transverse pivot 13. The rear end of this link is connected by a universal joint 14 to the link 15, connected as at 16 to the chassis by a transverse pivot, a stop 17 being provided upon the chassis for engaging the link 15 and limiting the forward movement thereof.

In Fig. 2, the spindle $6^a$ is journaled in the vertical bearing $7^a$ of the axle and the head $8^a$ of the spindle is provided with the ears $8^b$ through which is journaled a longitudinal horizontal pin $8^c$ upon which the block $8^d$ is journaled. This pin $8^c$ may be omitted if the spring is sufficiently flexible.

The spring $9^a$ may be rigidly connected to the block $8^d$ intermediate its ends, as shown at $9^b$, the forward end of the spring being rigidly connected to a bracket $10^a$ fixed to the chassis and the rear end of the spring being preferably connected by a universal joint $14^a$ to a link $15^a$ which is connected as by the universal joint $16^a$ to a bracket 18 carried by the chassis, a stop $17^a$ being provided upon the bracket to limit the forward movement of the link.

In Fig. 3, the front axle 2 is provided with a U-shaped member 19 which extends upward beyond the axle, and is connected to a smaller U-shaped member 20, resting upon the top of the axle, by means of a horizontal pin 21, to which is pivoted the block 22, said block being provided with a vertical spindle 23, upon which the collar $11^a$ is journaled.

This collar is connected by a transverse horizontal pivot $13^a$ with a link 12, similar to the link 12 shown in Fig. 1, and connected at its rear end to the chassis in the same manner as above described.

A lever 24 is pivoted upon a transverse horizontal axis as at 25, which is pivotally connected to the bracket 26 upon an inclined pivot 27, the rear end of the lever being provided with a bearing 28 journaled upon the pin 23. A projection $24^a$ is formed upon the forward portion of the lever and provided with a roller $24^b$ which engages the free end of a spring 29, the other end of which is carried upon a rigid bracket 30, fixed upon the chassis.

In Fig. 4, the spindle $6^b$ is located through a vertical bearing $7^b$ in the axle, and provided with a head $8^e$. A block $8^h$ is pivoted upon the ears $8^f$ of the head by the horizontal pin $8^g$ and the lower end of the spring $9^b$, which is preferably straight as shown, is fixed to said block, the forward end thereof being connected in the manner shown in Fig. 1.

A collar $11^b$ is journaled upon the spindle $6^b$ and the rear link 12, similar to the link 12 shown in Figs. 1 and 3, is connected to said collar as by the transverse horizontal pivot $13^b$.

A further modification is shown in Fig. 5, in which the vertical spindle $6^c$ is located through the vertical bearing $7^c$ in the axle and provided with the head $8^i$ to which is connected the intermediate portion of the leaf spring 50, the rear end thereof being connected by the transverse pivot 51 to a link 52 suspended from the chassis upon the transverse pivot 53, a stop 54 being provided to limit the forward movement thereof.

The forward end of the spring is connected by a transverse pivot 55 with the link 56, which is suspended from the chassis by the transverse pivot 57. An angular arm 58 is provided upon the link 56 and carries a roller 59 which engages the free end of the spring 60, the other end of which is fixed to the chassis as by the bracket 61.

In Figs. 8 and 9 is shown one means of attaching the spring suspension to a rear axle. The form of spring illustrated is that shown in Fig. 2, in which spring $9^a$ is connected, at its front and rear ends to the chassis and at an intermediate point to the axle.

In each of these forms, the spring is fixed intermediate its ends to a block 31 pivoted upon a longitudinal horizontal pin 32 carried between ears 34 of a head 35, provided with a spindle 36 or $36^a$ journaled in a bracket 37 or $37^a$, which is clamped upon the rear axle housing 38, thus providing for a movement of the spring similar to that of the front axle.

In Figs. 10 and 11 is shown a modified form of pivotal connection of the axle to the spring.

In this form, a square sleeve 65 is located around the spring and connected thereto as by the bolt 66. A trough 67 is mounted upon the top of the axle 2 and the sleeve 65 is loosely seated therein, a strap 68, provided with an aperture 69 to accommodate the head of the bolt 66, being located over the sleeve 65 and connected at opposite ends to the axle as at 70. Curved springs 71 are located between each side of the spring 72 and the adjacent sides of the strap 68.

In the form of the invention shown in Fig. 15, a curved or half-round spring 100 may be rigidly connected at one end to the vehicle frame at a point substantially above the axle 2, as shown at 101, the lower end of said spring being connected to the axle as by the vertical pivot shaft 102. The rear connection of the axle to the vehicle frame may be as by a rigid rod 12 connected in the same manner as above described.

From the above, it will be seen that in each case the axle is so connected to the chassis or frame that when the axle moves with relation to the frame in a normal manner, as when weight is added upon the frame when the vehicle is motionless, or if an obstacle is encountered by a wheel when the vehicle is in motion, the line of least resistance to such motion, as traced on a vertical, longitudinal plane, is approximately 45° upward and backward.

The connection of the axle to the member or members connecting it to the chassis or frame is by means of a connection which permits motion as about a substantially vertical pivot and also as about a longitudinal horizontal pivot. The connection of the suspension member to the chassis or frame at the rear of the axle may be by a link on a plain transverse pivot, or pivots having universal motion at one or both ends, or by a flexible link.

In Figs. 12, 13 and 14 are shown in diagram, a side elevation, front elevation and plan respectively of a wheel and portion of the vehicle. The mass center supported by this wheel is shown in each figure at MC. By referring to these figures, it will be clearly seen that the reactions from the average obstacles on the road shown at O, do not act along lines passing through the mass center affected, but at some distance to one side thereof.

The vertical component is indicated at VC, the longitudinal horizontal component at LHC and the transverse horizontal component at THC. My experiments have proven that the provision made by the improved spring suspension for utilizing the moment impressed on the center of the mass, as indicated, by the longitudinal horizontal component, results in transforming this component into a downward pull on the chassis and an upward pull on the wheel and axle.

The wheel is thus at least partially lifted over the obstacle and the downward pull on the chassis counteracts or balances or neutralizes, wholly or partially, the upward thrust received from the vertical component of the reaction.

The wheel being permitted to lag, as shown at A in Fig. 7, when encountering an obstacle on the road, affords the wheel more time in which to surmount the obstacle and tends to cushion the horizontal components of the reaction.

The improved spring suspension may be so proportioned and adjusted that with any ordinary obstacle and a given vehicle mass, the upward and downward forces impressed on the chassis will balance or neutralize each other to such an extent that when the wheel encounters and surmounts an obstacle, it will have practically no apparent effect on the chassis.

The forces impressed on the chassis by the vertical component and the transverse horizontal component also act as turning moments exerted about the mass center affected, the one due to the vertical component being neutralized as above described, while the one due to the transverse horizontal component is ordinarily too slight to require any more provision than the cushioning effect inherent in this construction.

Thus when any wheel encounters an obstacle, the axle is permitted to move with relation to the frame, allowing the wheel to lag in relation to the frame, affording more time for the wheel to surmount the obstacle and cushioning the horizontal component of the reaction from the obstacle.

Opportunity is afforded for the combined mass of the wheel and axle and that portion of the vehicle mass supported thereby to tend to rotate about a common center as the horizontal component of the reaction is impressed on the wheel spindle, causing this force to be absorbed in lifting the wheel over the obstacle and exerting a proportionate downward force upon the chassis or frame.

This depressing force exerted on the frame comes into opposition to the upward force impressed on the frame by the vertical component of the reaction from the obstacle, the two forces wholly or partially neutralizing each other, thus tending to leave the frame undisturbed.

Consideration of the above makes it obvious that this device utilizes the effect of the unsprung weight and makes wholly unnecessary and undesirable the extreme efforts hitherto made to reduce the proportion of the unsprung weight to the total weight.

I claim:—

1. The combination of an axle member and a suspension spring member, a shaft of substantial length and having a substantially vertical axis extending from one of the members, and a bearing journalling the shaft and mounted on the other member.

2. The combination of a vehicle frame, an axle and a sustaining member connected to the axle as by a substantially vertical pivot, and a pivoted link connecting the sustaining member to the vehicle frame at one point.

3. The combination of a vehicle frame, an axle and a substantially half-round suspension spring connected at one end to the vehicle frame and pivotally connected to the axle as by a substantially vertical pivotal connection.

In testimony that I claim the above I have hereunto subscribed my name.

WALTER W. WOOD.